UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

TRIPHENYLMETHANE DYE.

1,044,836.  Specification of Letters Patent.  Patented Nov. 19, 1912.

No Drawing.   Application filed November 10, 1911.   Serial No. 659,600.

*To all whom it may concern:*

Be it known that I, MAX WEILER, doctor of philosophy, chemist, citizen of the German Empire, residing at Elberfeld, Germany, have invented new and useful Improvements in Triphenylmethane Dye, of which the following is a specification.

I have discovered new dyestuffs of the triphenylmethane series which can be chromed after dyeing furnishing generally blue to violet shades fast to alkali and fulling. The process for their production consists in condensing meta-oxybenzaldehydes substituted in the nucleus and in which the hydrogen of the oxy group is substituted, with oxycarboxylic acids or mixtures thereof and oxidizing the leuco compounds thus obtained. They are after being dried and pulverized dark powders soluble in dilute caustic soda lye with a bluish coloration and dyeing wool after chroming generally blue to violet shades.

In order to illustrate the new process more fully the following example is given, the parts being by weight:—23.1 parts of para-chloro-ortho-nitrophenyl-3-oxy-2.6-dichlorobenzaldehyde:

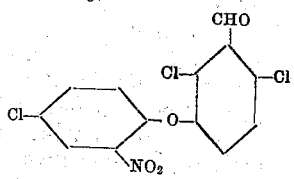

and 21 parts of ortho-cresotinic acid are stirred together with 320 parts of a strong sulfuric acid until the aldehyde has disappeared. The mixture is poured on ice and the leuco compound which is thus separated is filtered off. It can also be directly oxidized in the mixture by the addition of nitrosyl sulfuric acid while the mixture is stirred at from 20–45° C. until the quantity of the dye produced is not further increased and the evolution of nitrogen oxides ceases. The product of the reaction is poured on ice and the dyestuff is filtered off.

The structural formula of the dye is graphically represented as follows:

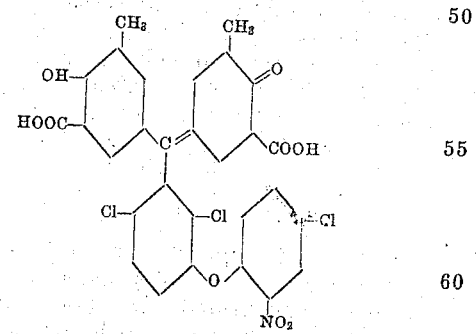

The new dyes form valuable lakes.

In the following table the properties of some of the new dyes are given:—

| Dyestuff obtained from— | Solubility in water. | Solubility in NaOH. | Wool-dyeing after chromed. |
|---|---|---|---|
| Ortho-nitrophenyl-3-oxy-2.6-dichlorobenzaldehyde+ortho-cresotinic acid. | Scarcely, red. | Blue. | Blue. |
| Ortho-para-dinitrophenyl-3-oxy-2.6-dichlorobenzaldehyde+ortho-cresotinic acid. | Scarcely, red. | Blue. | Greenish-blue |
| Dinitrophenylene-bis-3-oxy-2.6-dichlorobenzaldehyde+4-ortho-cresotinic acid (obtained from 1.3-dichloro-4.6-dinitrobenzene+2 mol. 3-oxy-2.6-dichloro+benzaldehyde). | Almost insoluble. | Blue. | Blue. |
| Para-chloro-ortho-nitro-phenyl-3-oxy-6-sulfobenzaldehyde+ortho-cresotinic acid. | Easily, red-orange. | Violet. | Reddish-blue. |

| Dyestuff obtained from— | Solubility in water. | Solubility in NaOH. | Wool-dyeing after chromed. |
|---|---|---|---|
| Para-chloro-ortho-nitrophenyl-3-oxy-6-sulfobenzaldehyde+salicylic acid. | Easily, red-orange. | Red-violet. | Violet. |
| 3-methoxy-2.4.6-trichlorobenzaldehyde+ortho-cresotinic acid. | Scarcely, raspberry. | Blue. | Blue. |
| Ortho-nitro-para-sulfophenyl-3-oxy-2,6-dichlorobenzaldehyde+ortho-cresotinic acid. | Easily, red-orange. | Blue. | Blue. |
| 3-methoxy-2.6-dibromobenzaldehyde+ortho-cresotinic acid. | Scarcely, bluish-red. | Blue. | Blue-green. |
| 3-carboxymethoxy-2.4.6-trichlorobenzaldehyde+ortho-cresotinic acid (obtained from chloro-acetic acid+3-oxy-2.4.6-trichlorobenzaldehyde). | Difficultly, raspberry-red. | Blue-violet. | Blue. |
| Carbonyl-bis-3-oxy-2-4-6-trichlorobenzaldehyde+ortho-cresotinic acid. | Difficultly, raspberry-red. | Blue-violet. | Blue. |

I claim:—

1. The herein described triphenylmethane dyestuffs, being oxidized leuco-condensation products of oxycarboxylic acids with meta-oxybenzaldehydes substituted in the nucleus and in the oxy-group, having the following general formula:

in which $R_1$ and $R_2$ are oxy-carboxylic acid nuclei, and R is a meta-oxy-benzene nucleus, substituted in the oxy-group and in the nucleus, which are after being dried and pulverized dark powders soluble in dilute caustic soda lye with a blue to violet coloration; dyeing wool after chroming generally blue to violet shades, substantially as described.

2. The herein described new triphenylmethane dyestuffs, being oxidized condensation products of oxycarboxylic acids with chlorin substituted meta-oxybenzaldehydes, substituted in the oxy group, having the following general formula:

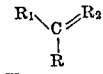

in which $R_1$ and $R_2$ are oxy-carboxylic acid nuclei, and R is a chlorin substituted meta-oxy-benzene nucleus substituted in the oxy group, which are after being dried and pulverized dark powders soluble in dilute caustic soda lye with a blue to violet coloration and dyeing wool after chroming generally blue to violet shades, substantially as described.

3. The herein described triphenylmethane dyestuffs, being oxidized condensation products of oxycarboxylic acids with poly-chlor substituted meta-oxybenzaldehydes, substituted in the oxy group, having the following general formula,

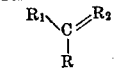

in which $R_1$ and $R_2$ are oxy-carboxylic acid nuclei, and R is a polychlor substituted meta-oxy-benzene nucleus substituted in the oxy group, which are after being dried and pulverized dark powders, soluble in dilute caustic soda lye with a blue to violet coloration; and dyeing wool after chroming generally blue to violet shades, substantially as described.

4. The herein described triphenylmethane dyestuffs, being oxidized condensation products of oxycarboxylic acids with dichlor-substituted meta-oxybenzaldehydes, substituted in the oxy group, having the following general formula:

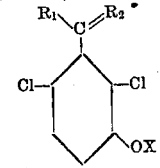

in which $R_1$ and $R_2$ are oxy-carboxylic acid nuclei, and R is a dichlor-substituted meta-oxy benzene nucleus substituted in the oxy group, which are after being dried and pulverized dark powders soluble in dilute caustic soda lye with a blue to violet coloration and dyeing wool after chroming generally blue to violet shades, substantially as described.

5. The hereindescribed triphenylmethane dyestuffs, being oxidized leuco-condensation products of oxy-carboxylic acids with 2.6-dichlor substituted meta-oxy benzaldehydes substituted in the oxy-group, having the following formula:

in which $R_1$ and $R_2$ are oxy-carboxylic acid nuclei and X is a substituent, which are after being dried and pulverized dark powders soluble in dilute caustic soda lye with a blue to violet coloration, and dyeing wool after chroming generally blue to violet shades, substantially as described.

6. The hereindescribed triphenylmethane dyestuff having the following graphically represented formula:

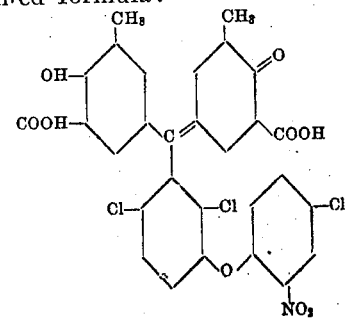

which, after being dried and pulverized, is a dark powder, soluble in dilute caustic soda lye with a bluish coloration, dyeing wool chroming a bluish shade, substantially as described.

In testimony whereof I have hereunto set my hand in the presence of two subscribing witnesses.

MAX WEILER. [L. S.]

Witnesses:
 ALBERT NUFER,
 HELEN NUFER.